United States Patent
Taylor

[11] Patent Number: 5,326,539
[45] Date of Patent: Jul. 5, 1994

[54] OZONE GENERATOR WITH INTERNAL HEATING MEANS

[75] Inventor: Brian B. Taylor, Windham, Conn.

[73] Assignee: Environics Inc., West Wilmington, Conn.

[21] Appl. No.: 75,109

[22] Filed: Jun. 11, 1993

[51] Int. Cl.⁵ ............................................ B01J 19/08
[52] U.S. Cl. ........................... 422/186.3; 422/186.07
[58] Field of Search ....................... 422/186.07, 186.3

[56] References Cited

U.S. PATENT DOCUMENTS

| | | | |
|---|---|---|---|
| 1,969,655 | 8/1934 | Mailey | 422/186.07 |
| 4,045,316 | 8/1977 | Zegan | 204/158 R |
| 4,156,652 | 5/1979 | Wiest | 250/527 |
| 4,179,616 | 12/1979 | Caviello et al. | 250/527 |
| 4,189,363 | 2/1980 | Beitzel | 204/157.1 R |
| 4,971,687 | 11/1990 | Anderson | 210/85 |
| 4,983,307 | 1/1991 | Nesathurai | 210/748 |
| 5,024,741 | 6/1991 | Maja | 204/157.22 |
| 5,069,885 | 12/1991 | Ritchie | 422/186 |

OTHER PUBLICATIONS

Dimitriou, M. A., "Design Guidance Manual for Ozone Systems," International Ozone Association, pp. 3, 4, 5–8, 16–18; 1990.

Primary Examiner—Donald P. Walsh
Assistant Examiner—Daniel J. Jenkins
Attorney, Agent, or Firm—Hayes & Reinsmith

[57] ABSTRACT

An ozone generator is provided wherein pressure controlled air is supplied to an enclosure containing an ultraviolet light source arranged so that the air circulates cylonically about the source to exit the enclosure. Temperature control for lamp and air in the housing is provided.

3 Claims, 3 Drawing Sheets

OZONE GENERATOR WITH INTERNAL HEATING MEANS

This invention generally relates to apparatus for generating ozone at a rapid rate on a stable predictable basis and includes apparatus for generating such ozone at variable yet precise ozone concentrations at differing preselected flow rates and pressures.

BACKGROUND OF THE INVENTION

In accordance with well-known prior art techniques, when a gas containing oxygen flows in a chamber in proximity to a 185 nanometer wavelength light emitting source (hereinafter ultraviolet source), a portion of the $O_2$ is converted to ozone, $O_3$. Variation of ultraviolet light intensity is a known accepted technique to control the amount of $O_2$ conversion to $O_3$ (ozone), the magnitude of ozone being measured in parts per million.

Also in accordance with prior art techniques, a closed-loop control circuit can be used to increase or decrease the energy supplied to the ultraviolet lamp and thus control the level of ultraviolet illumination. A suitable sensor can be used to detect the energy output of the UV lamp and the sensor output is converted and compared to the command signal to the UV lamp to control energy output. So also, the prior art teaches the use of an enclosure for the lamp and that enclosure temperature should be accurately maintained and adjustable because the temperature within the enclosure is also a known factor affecting the generation of ozone. Finally, it is also a known factor that changing the gas pressure within the ozone generator also affects the rate at which ozone is produced.

OBJECTS OF THE INVENTION

It is an object of this invention to provide improved apparatus capable of creating a substantially constant ozone concentration in gas exiting the apparatus.

It is a further objection of this invention to provide improved apparatus wherein gas pressure in the ozone generating apparatus may be held substantially constant at various gas flow rates.

An additional object of this invention is to provide improved apparatus wherein gas enters the apparatus, cylonically circulates about the ultraviolet light source and thereafter exits the apparatus with a substantially constant ozone concentration.

A still further object of the invention is the provision of improved ozone generation apparatus capable of providing improved stability of ozone creation with various gas flow rates and pressures.

These and other objects will be in part obvious and in part pointed out more in detail hereinafter.

A better understanding of this invention will be obtained from the following detailed description and accompanying drawings of illustrative applications of the invention.

SUMMARY OF THE INVENTION

An ozone generator is provided wherein pressure regulated air is supplied to an enclosure containing an ultraviolet light source arranged so that the air circulates cylonically about the source to exit the enclosure. Temperature control for air in the housing is provided.

DESCRIPTION OF A PREFERRED EMBODIMENT

Figure 1:
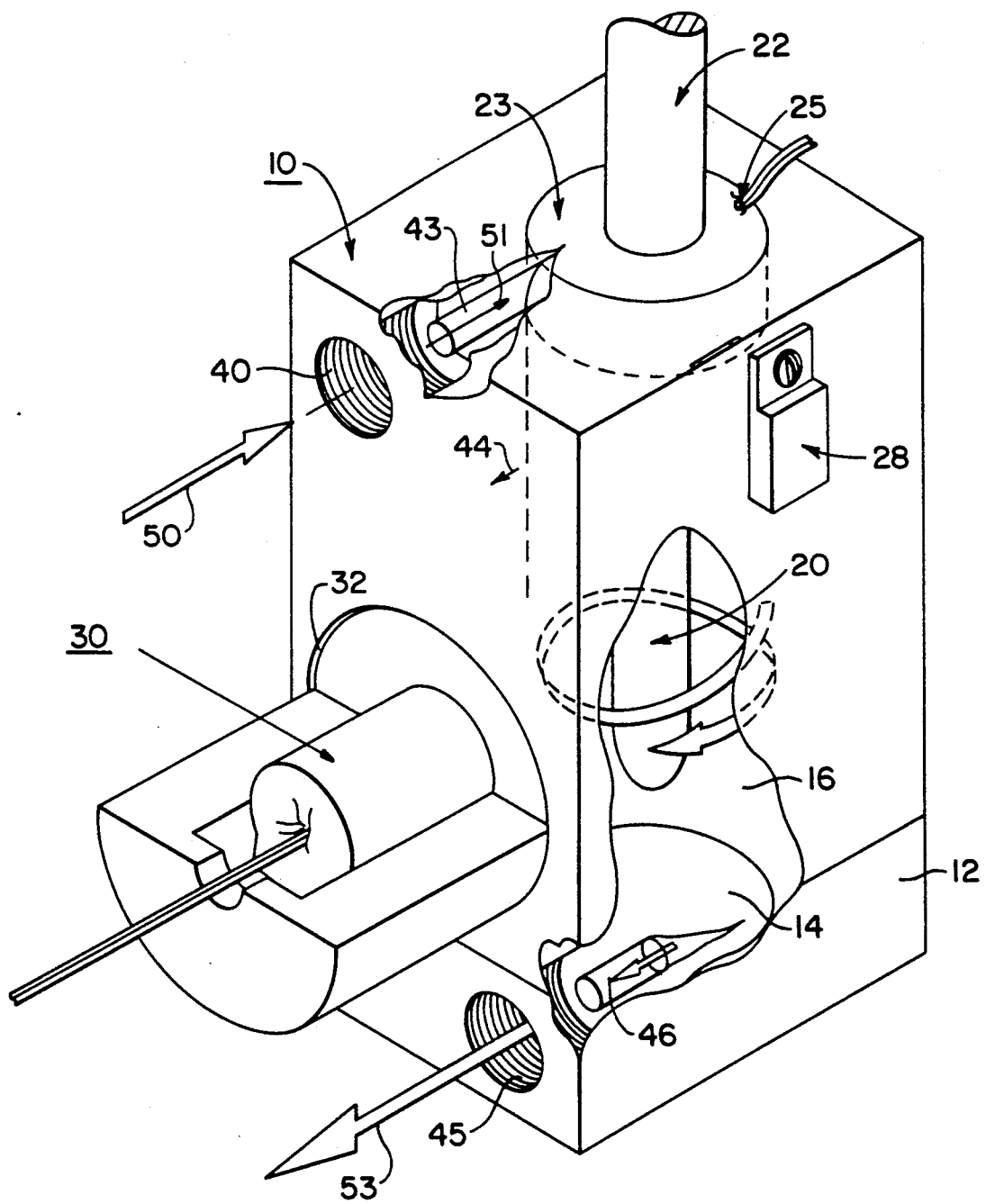
FIG. 1 is a schematic perspective of the ozone generating apparatus of this invention illustrating a preferred gas flow feature of the invention.

Turning to the drawings and particularly to FIG. 1 thereof, there is shown a housing 10 which, in its preferred embodiment, is formed from a block of machined metal, the housing 10 having a top surface 11 and a bottom closure member 12 which define a bored passageway 14 having a generally cylindrical side wall 16 therein. An ultraviolet lamp generally designated 20 is provided with a base 22 which is mounted on top surface 11 of the housing 10 by a metal lamp mounting collar 23. The wires 25 supply the desired power to lamp 20 for its energization.

Housing 10 is provided with an electrical heater 28 to control the interior temperature of the cylindrical chamber. A suitable light detector 30 is secured in a side wall aperture 32 and sealed thereto in any suitable manner with the output of the light detector is provided by the cables 34.

An inlet aperture 40 is provided in the enclosure 10, which aperture is provided with internal threads for suitable connection to an air source with an internal passageway 43 disposed to enter the cylindrical chamber side wall 16 tangential to the cylindrical side wall 44. An exit aperture 45 is provided in bottom surface 12 with an exit passageway 46 from the generally cylindrical interior chamber side wall 16 being provided such that air entering in the direction of arrow 50 proceed through the passageway 43 as shown at arrow 51 to cylonically circulate within the cylindrical chamber as indicated by the arrow 52 and to thereafter exit from the bottom of the cylindrical chamber side wall as shown at the exit arrow 53, the threaded interior of the exit being arranged for connection to a suitable use device.

In the fundamentals of the device shown in FIG. 1, it is seen that a generally sealed ozone generator housing is provided with a tangentially disposed air inlet to a generally cylindrical chamber having top and bottom members, a substantially tangential air outlet, a mounting for the ultraviolet light along the axis of the cylinder and a suitable heater and a suitable light sensor for the control functions that are desired.

Figure 2:
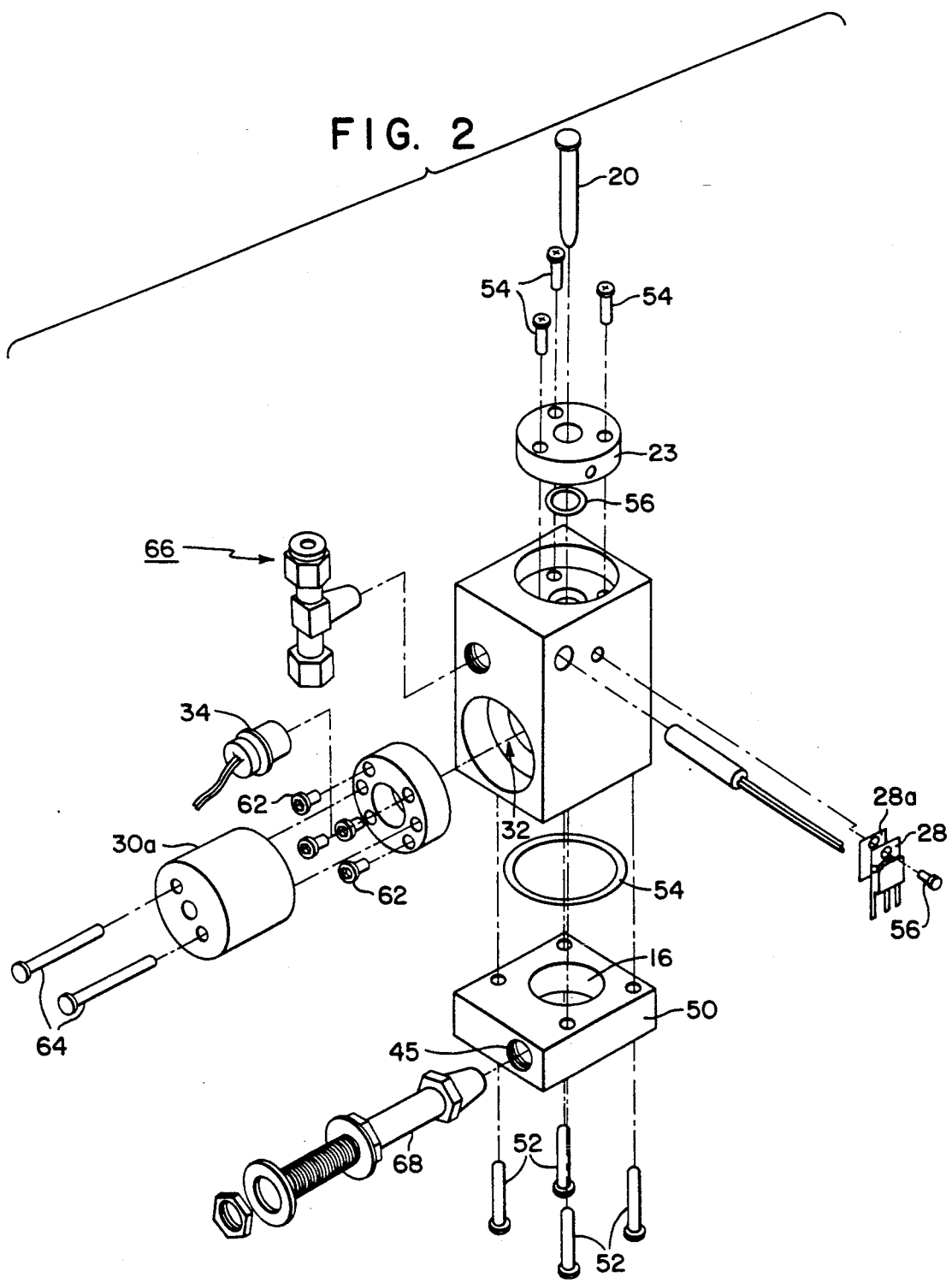
FIG. 2 is an exploded perspective view of typical construction of a portion of the apparatus of FIG. 1.

Turning next to FIG. 2 when viewed in light of the schematic of FIG. 1, it is noted that the housing 10 is fitted with an inlet aperture 40 and that the bottom 50 completes the cylindrical internal side wall 16 and is fastened by fasteners 52 to the body 10 with O-ring 54 serving as the sealing element.

As noted in connection with FIG. 1, lamp mounting collar or holder 23 appropriately mounts lamp 20 along the central axis of the cylindrical side wall 16 provided in housing 10, the lamp holder being fastened to housing 10 by fasteners 54 and sealed to the body by O-ring 56. Heater 28 as is shown in the exploded drawing as being secured to the housing (and insulated by member 28a) by fastener 56 with a thermister 58 serving as the temperature sensor for the internal cavity. The detector/sensor 34 for analyzing lamp output is suitably secured with the retainer detector seal 60 by fasteners 62 with element 30 being suitably secured by fasteners 64. Member 66 is both a pressure regulator and orifice serving to control air flow into inlet opening 40 as hereinafter described in greater detail.

Outlet connector 68 is provided with threaded portions, washers, etc., to effect the desired connection to the use device.

With the apparatus thus described, there is shown a functioning ozone generator with a housing 10, a cylindrical interior side wall 16, top and bottom closures 11, 12 and an ultraviolet lamp 20. Air inlet 43 and air outlet 46 are so dispersed relative to the cylindrical side wall 16 that air is moved in a cyclonic fashion and descending manner about lamp 20. Heater 28 serves to maintain the desired lamp temperature and air temperature within the housing and thermister 58 is provided to sense that interior temperature for control purposes.

The regulator orifice relationship of the member 66 provides a pressure regulator of any suitable type with an orifice upstream of the regulator and serves to control pressure within the chamber. Suitable connecting elements (not shown) are provided for incorporating the ozone generator into a functioning system.

Figure 3:
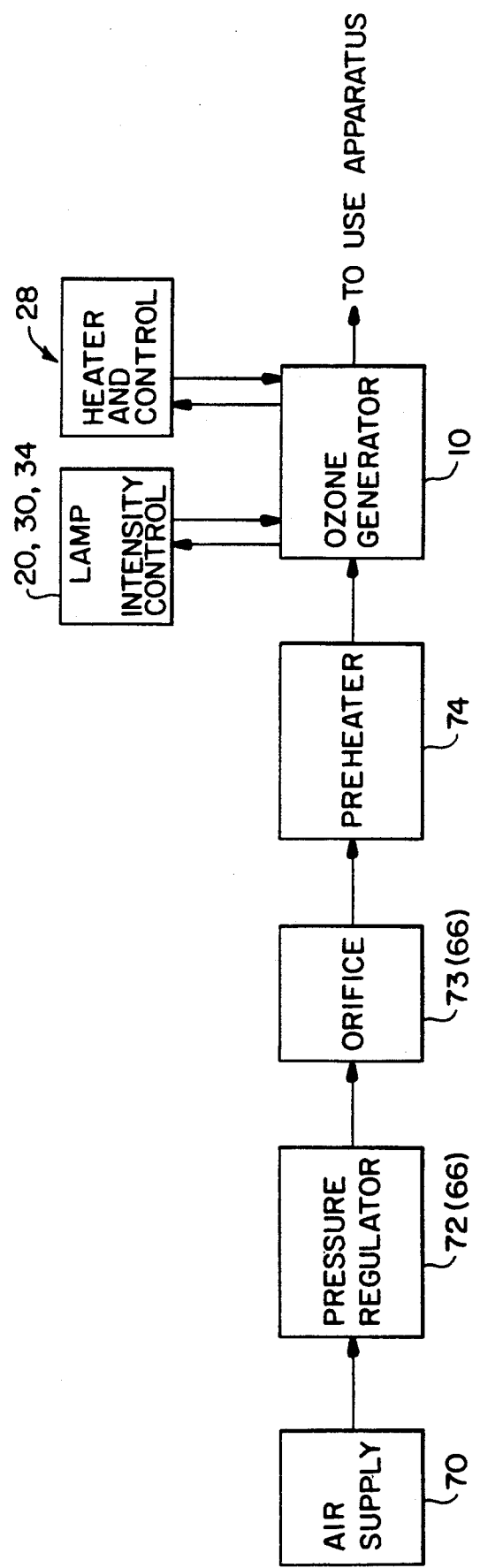
FIG. 3 is an air flow and control diagram for an embodiment of this invention.

Turning next to the diagram of FIG. 3, it should be observed that this figure, while dealing with known portions of the prior art, describes a system including an air supply 70 which directs air first through a pressure regulator 72 and then through orifice 73 so as to control the back pressure within the ozone generator (depending, of course, upon the use devices, tubing, etc.). Air preheater 74 raises air temperature before entering housing 10 and coming in contact with lamp 20. Tubing 74 functions as an air preheater because of its proximity of housing 10. Heater unit 76 includes heater 28 and its energizing closed loop control circuitry for maintaining internal temperature in the ozone generator housing 10. The ultraviolet lamp 20 is energized by a suitable source to provide the desired ultraviolet intensity, which intensity is controlled much like the aforementioned heater control using feedback loop including sensor 34 to maintain the desired level of lamp intensity. It should be noted that the lamp intensity of the present invention is such the sensor is selected to be responsive to the emission of the energy at a wavelength other than the ozone generating 185 nm ultraviolet wavelength, and 254 nm is the preferred frequency.

By keeping the mass of housing 10 and its associated parts as low as reasonable, it is possible to minimize thermal inertia in establishing and maintaining the desired temperature, temperature so as to achieve equilibrium within several minutes of a lamp power change when the delivery expectations of the ozone generator is varied.

The regulation of ozone pressure is achieved by either using a constant flow rate and constant delivery tubing lengths or by placing a back pressure regulator downstream of the ozone generator, an orifice upstream of the ozone generator and a pressure regulator ahead of that orifice, further upstream thereby to control source airflow rate through the ozone generator.

By utilizing state of the art closed loop heater control circuits, closed loop lamp intensity control circuits, cyclonic flow within the ozone generator and appropriate pressure regulation and back pressure control, it is possible to achieve substantially constant ozone flow once the desired concentration has been decided upon. Similarly, in an effort to minimize the effects of varying source air temperature, an air preheater is provided to further enhance the dependability of the apparatus.

It is believed that one of significant features of the present apparatus is the provision of cyclonic air flow around the ultraviolet lamp. Additionally, the provision of specific heat control, pressure controls and lamp intensity controls are all intended to provide an ozone generator meeting the objects of the invention.

Although this invention has been illustrated and described with respect to exemplary embodiments thereof, it should be understood by those skilled in the art that various changes, omissions and additions may be made without departing from the spirit and scope of the invention.

I claim:
1. An ozone generator comprising:
   a generally sealed housing have a substantially cylindrical interior side wall, and top and bottom walls sealed thereto;
   an ultraviolet lamp supported at least partially within said housing and disposed along the central axis of and generally spaced from the substantially cylindrical interior side wall and including mean for energizing the lamp;
   said lamp being primarily located adjacent to one of said end walls of the cylindrical interior;
   a heater provided for raising the temperature of the air within said housing and closed-loop means for controlling the rate at which said heater operates to maintain the desired temperature control of air as it passes therethrough,
   an air inlet in the cylindrical side wall disposed to admit air primarily tangentially to said side wall and adjacent an end wall thereof; and
   an air outlet in the cylindrical side wall disposed adjacent to the end wall opposite to the inlet end wall and disposed generally tangential to the side wall whereby air entering the housing travels in a generally cyclonic pattern passing around the ultraviolet lamp to exit the air outlet thereby to provide the desired ozone.

2. The ozone generator of claim 1 wherein a pressure regulator is placed in an air passageway of the chamber thereby to control pressure within the chamber based upon desired pressure parameters including inlet pressure, back pressure and flow rates.

3. The ozone generator of claim 1 wherein a heater is provided for controlling the temperature of the lamp and air within said housing and means for controlling the rate at which said heater operates to maintain the desired temperature control of the lamp and of the air as it passes therethrough and wherein a pressure regulator is placed in an air passageway of the chamber thereby to control pressure within the chamber.

* * * * *